United States Patent

[11] 3,626,422

[72] Inventor William A. Lloyd
San Jose, Calif.
[21] Appl. No. 845,358
[22] Filed July 28, 1969
[45] Patented Dec. 7, 1971
[73] Assignee Varian Associates
Palo Alto, Calif.

[54] ELECTROGRAPHIC-WRITING HEAD HAVING A PREPONDERANCE OF CONDUCTIVE PORTIONS ENGAGING THE RECORDING MEDIUM
6 Claims, 3 Drawing Figs.

[52] U.S. Cl. ........ 346/74 ES
[51] Int. Cl. ........ G03g 15/00
[50] Field of Search ........ 346/74 ES; 101/DIG. 13

[56] References Cited
UNITED STATES PATENTS

| | | | |
|---|---|---|---|
| 3,193,836 | 7/1965 | Kerr | 346/74 ES |
| 3,307,198 | 2/1967 | Morgan | 346/74 ES |
| 3,500,434 | 3/1970 | Zaphiropoulos | 346/74 ES |

*Primary Examiner*—Terrell W. Fears
*Assistant Examiner*—Howard W. Britton
*Attorney*—Leon F. Herbert

ABSTRACT: An electrographic-writing apparatus is disclosed having a writing head containing plural-writing electrodes and having portions bearing against the charge retentive surface of the recording medium. A backup electrode structure is spaced from the recording head to define a writing gap through which the recording medium is passed. A preponderance of the bearing surface of the recording head is formed by an electrode structure operated at a potential independent of the writing electrodes and at the potential of the backup electrode, to prevent depositing unwanted charges on the recording medium.

PATENTED DEC 7 1971 3,626,422

INVENTOR.
WILLIAM A. LLOYD
BY
Leon F. Herbert
ATTORNEY

ELECTROGRAPHIC-WRITING HEAD HAVING A PREPONDERANCE OF CONDUCTIVE PORTIONS ENGAGING THE RECORDING MEDIUM

DESCRIPTION OF THE PRIOR ART

Heretofore, writing heads for electrographic writing apparatus, such as printers and recorders have comprised a generally insulative structure, such as fiberglass plastic, bearing against the charge retentive surface of the recording medium with an array of writing electrodes (styli and a timing bar) being embedded in the plastic. The ends of the electrodes were exposed to the charge retentive surface of the recording medium at the bearing surface of the head for depositing charge images on the charge retentive surface as the recording medium slid past the head. A backup electrode was also employed opposite the head for applying a certain potential to the conductive backing of the recording medium (conductive paper supporting a charge retentive plastic film).

One of the problems encountered with this prior art writing head was that, at relatively high paper transport speeds unwanted charges were deposited by the plastic bearing surfaces of the head onto the charge retentive surface of the recording paper. When the charge images, as deposited by the writing electrodes, were subsequently developed the unwanted charges appeared as background streaks.

SUMMARY OF THE PRESENT INVENTION

The principal object of the present invention is the provision of an improved electrographic writing head.

One feature of the present invention is the provision, in an electrographic recording head, of a second electrode structure forming a preponderance of the bearing surface of the recording head, such second electrode structure being insulating from the writing electrodes within the head and operating at a nonwriting potential, to minimize the deposit of unwanted charges on the recording medium.

Another feature of the present invention is the same as the preceding feature wherein the second electrode structure of the writing head is operated at essentially the same potential as that applied to a backup electrode structure, disposed on the opposite side of the writing gap from the writing head.

Another feature of the present invention is the same as any one or more the preceding features wherein the second electrode structure includes a pair of electrodes having the writing electrode structure insulatively sandwiched therebetween.

Another feature of the present invention is the same as the preceding feature wherein the writing electrodes are supported from the second electrodes via an elastic potting compound to permit flexure of certain portion of the writing electrodes.

Other features and advantages of the present invention will become apparent upon a perusal of the following specification taken in connection with the accompanying drawings wherein:

DESCRIPTION OF THE PREFERRED EMBODIMENTS

Figures 1, 2, 3:
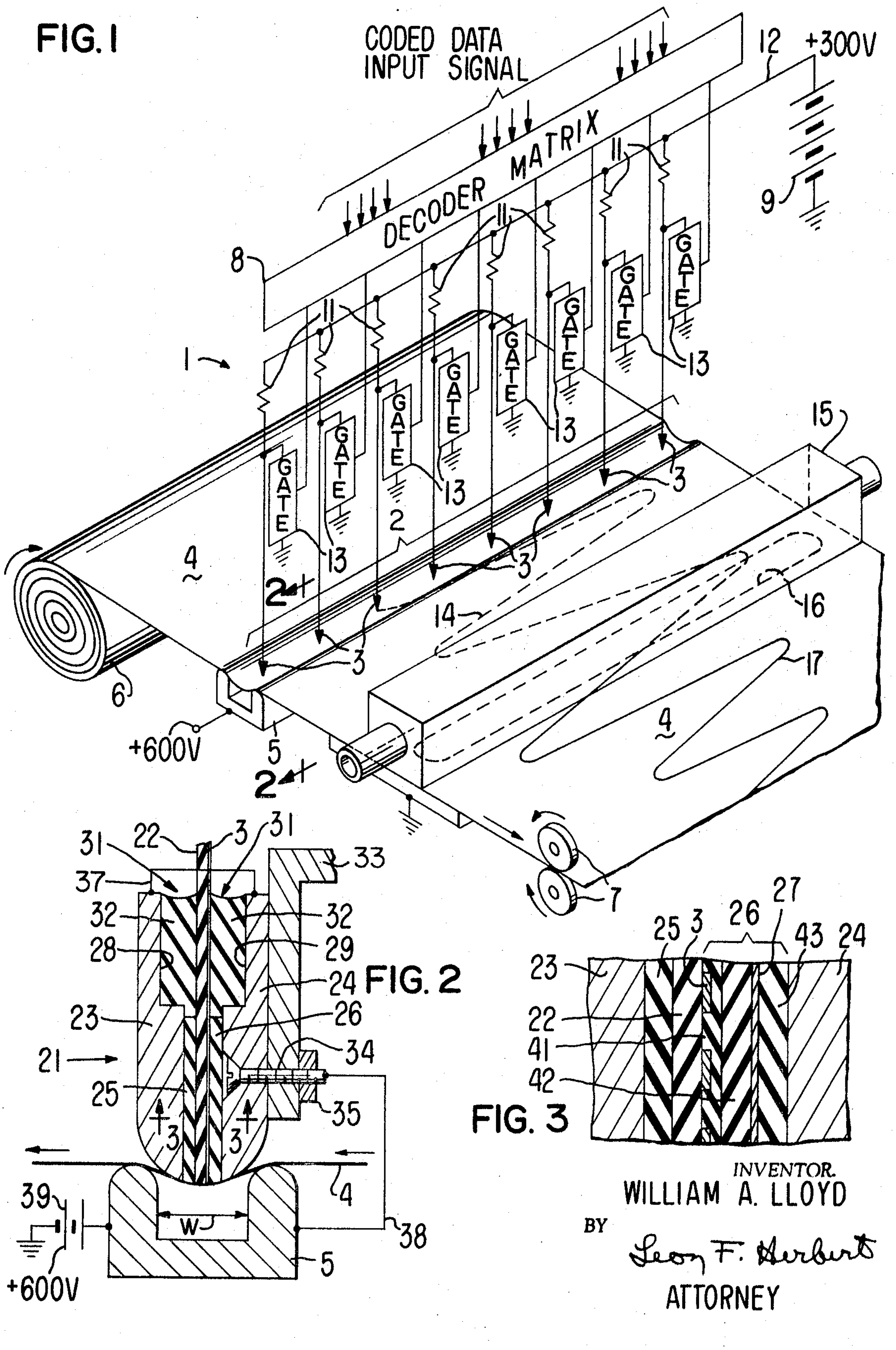
FIG. 1 is a schematic perspective line diagram, partly in block diagram form, of an electrographic writing apparatus incorporating the preponderantly conductive recording head
FIG. 2 is an enlarged sectional view of the recording head and backup electrode of the structure of FIG. 1 taken along line 2—2 in the direction of the arrows.
FIG. 3 is an enlarged sectional view of a portion of the recording head of FIG. 2 taken along line 3—3 in the direction of the arrows.

Referring now to FIG. 1, there is shown an electrographic apparatus 1 including an array 2 of electrographic style 3 arranged crosswise of an electrographic-recording medium 4, such as electrographic-recording paper having a dielectric film supported on a conductive paper backing, which is drawn between the array 2 and a channel-shaped backup electrode 5 from a supply roll 6 by a pair of drive wheels 7 with the dielectric film facing the styli 3.

The styli 3 are selectively energized with writing potential in response to a coded data input signal, typically binary coded data, which is fed to a decoder matrix 8 for decoding the input signal and energizing corresponding ones of the electrographic styli 3. More particularly, each of the styli 3 is connected to a source of constant positive potential 9, such as +300 v., via load resistors 11 and resistors 11 and a common bar 12. Each stylus 3 is shunted to ground potential via a normally nonconducting gate 13 such that, in the nonwriting condition, +300 v. is applied to each of the styli 3. A positive potential, as of +600 applied to the backup electrode 5 such that, in the nonwriting condition, 300 v. appears across the recording paper 4. Three hundred volts is insufficient voltage to break down the airgap between the charge retentive surface of the paper 4 and the styli 3 for transfer of charge to the charge retentive surface.

To produce writing, an output of the decoder matrix 8 opens (turns on) a selected one of the gates 13 causing the potential on the corresponding stylus 3 to drop from +300 v. to ground potential, thereby producing a voltage drop of 600 v. across the airgap between the selected stylus 3 and the charge retentive surface of the paper 4. This is a sufficient voltage across the paper and gap to break down the airgap and transfer charge to the charge retentive surface of the paper.

Sequential energization of the styli 3 in response to coded input signals produces a negative charge image 14 on the recording medium 4. Charged toner particles, such as positively charged carbon particles suspended colloidally in a dielectric vehicle, are applied to the charge image 14 via an inking channel 15 having a slot 16 in the wall facing the image 14. Toner is fed continuously through the inking channel 15 from a source, not shown, at subatmospheric pressure such that the paper 4 seals the marginal edges of the inking slot 16. The positive toner particles are attracted to and held to the negative charge image 14, thereby developing same at 17.

In a typical example of the electrographic writing apparatus 1, the array 2 includes 100 styli to the linear inch, taken in the direction crosswise of the recording medium, with each stylus 3 having a width in the crosswise direction of 0.005 inch and being spaced from the adjacent styli by 0.005 inch. The array 2 can have a length of a few inches to more than 10 inches.

Referring now to FIGS. 2 and 3, the array 2 of styli 3 includes writing head structure 21 disposed at the writing end of the styli 3 facing the channel-shaped backup electrode 5. The styli 3 are carried from one face of an insulative flexible printed circuit board 22, as of 0.010 inch thick flexible fiberglass. The array of styli 3 is conveniently formed on the circuit board 22 by conventional printed circuit techniques. The writing end of the printed circuit board 22, having the styli 3 affixed thereto, is sandwiched between a pair of conductive electrodes 23 and 24, as of aluminum, which extend across the array 2 and crosswise to the direction of movement of the recording medium 4. A pair of electrically insulative plate-shaped structures 25 and 26, as of fiberglass, are disposed between the circuit board 22 and the pair of electrodes 23 and 24, respectively, for insulating and spacing the styli 3 from the electrodes 23 and 24. Insulative structure 26 may comprise a composite structure including an embedded timing bar electrode 27, shown in detail in FIG. 3, and more fully described below. The sandwich writing head structure 21 is held together as a rigid unitary member by epoxy adhesive provided at the interfaces of the sandwiched members 23, 25, 22, 26, and 24.

The electrodes 23 and 24 are internally recessed at 28 and 29 to provide pockets 31 on both sides of the printed circuit board 22. The pockets 31 are filled with an elastic potting compound 32, such as room temperature vulcanizing silicone rubber, to provide an elastic support and stress relief for the flexible circuit board 22 at the point of its entry into the head assembly 21.

The writing head assembly 21 is carried from a right-angle support bracket 33, as of aluminum, via a plurality of sheet metal screws 34 passing through electrode 24 and bracket 33 and terminating in nuts 35. The support bracket 33 is fixedly mounted to the housing, not shown, of the writing apparatus 1.

The writing end of the writing head structure 21 is rounded, with a radius of curvature, as of 0.375 inches, and projects slightly into the open end of the channel-shaped backup electrode 5. In this manner, the dielectric charge retentive film portion of the recording medium 4 is caused to ride in sliding engagement with the rounded end of the writing head 21, whereas the conductive paper backing portion of the recording medium is caused to ride in sliding engagement with the rounded ends of the two upright sides of the channel-shaped backup electrode 5.

In a typical example, the width *w* of the channel in the backup electrode is 0.250 inches. The thickness of each of the electrodes 23 and 24, at the writing end of the head 21, is 0.150 to 0.200 inches, whereas the total thickness of the dielectric structure 25, 22 and 26 sandwiched between electrodes 23 and 24 is 0.045 to 0.075 inches. With these proportions, a preponderance of the surface area of the writing head 21 which bears against the charge retentive surface of the recording medium is comprised of the surface area of the two electrodes 23 and 24, thereby tending to minimize that portion of the bearing surface area of the head 21 formed by dielectric structure. In this manner, transfer of undesired electrical charge to or from the charge retentive surface of the recording medium is avoided.

Electrodes 23 and 24 are operated at a nonwriting potential which is independent of the writing potential applied to the styli 3. In a preferred embodiment, electrodes 23 and 24 are electrically interconnected via lead 37 and connected to the backup electrode 5 via lead 38 for operation at the same potential as backup electrode 5, as of +600 v., supplied to the electrode 5 via source 39. When the electrodes 23 and 24 are operated at the same potential as backup electrode 5, no electric field will exist across the leading edge of the writing gap between electrodes 24 and 5. Thus, no charge flows there. At the trailing edge gap between electrodes 5 and 23, after deposit of charge on the recording medium, a potential difference will exist between the deposited charge image 14 and electrode 23 but this potential is insufficient to break down the air gap therebetween, thus avoiding charge transfer.

Referring now to FIG. 3, the insulator and writing electrode structures, as sandwiched between electrodes 23 and 24, will be described in greater detail. In particular, insulator structure 26 includes a thin sheet of insulative fiberglass cloth 41, as of 0.002 inch thick, bonded over the styli 3 to allow handling of the printed circuit board 22 without scratching or otherwise damaging or shorting the array 2 of styli 3. A printed circuit board 42, as of 0.010 to 0.020 inch thick fiberglass, has the timing bar writing electrode 27 formed thereon and extending across the array 2 of styli for printing timing lines on the recording medium. A sheet of fiberglass insulation 43, as of 0.010 to 0.020 inches thick, insulates the timing bar 27 from electrode 24.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrostatic recorder for forming a charge image on the charge-retentive surface of a recording medium having a conductive backing, comprising the combination:

a recording head having a bearing surface which engages the charge-retentive surface of the recording medium, a preponderance of the bearing surface formed by conductive material so as to minimize unwanted charge transfer between the recording head and the recording medium due to relative motion therebetween;

a backup electrode positioned proximate to the recording head in electrical contact with the conductive backing of the recording medium for retaining the charge retentive surface of the recording medium in engagement with the bearing surface of the recording head;

means for establishing relative movement of the recording medium between the recording head and the backup electrode;

a plurality of writing electrodes mounted within the recording head the terminal surfaces of which are exposed along the bearing surface of the recording head;

means for selectively activating the writing electrodes for establishing a writing discharge between the activated writing electrode and the backup electrode through the recording medium; and insulative means between the writing electrodes and the conductive material in the recording head, the insulative means having a thickness sufficient to avoid writing discharge between the conductive material and the writing electrodes.

2. The recorder of claim 1, wherein the backup electrode and the conductive portions of the recording head are operated at substantially equal electrical potentials.

3. The apparatus of claim 1, wherein the plurality of writing styli form an array of electrographic styli.

4. The apparatus of claim 1, wherein the conductive structure of the recording head is positioned on both sides of the plurality of writing electrodes.

5. The apparatus of claim 1, wherein the insulative means for insulating the writing electrodes from the conductive structure of the recording head includes a sheet of electrically insulating material having the writing electrode affixed thereto.

6. The recording apparatus of claim 1, wherein the backup electrode is trough-shaped and the recording head-bearing surface is rounded and projects slightly into the trough backup electrode for maintaining the recording medium in engagement with the bearing surface of the recording head.

* * * * *